Patented Jan. 24, 1933

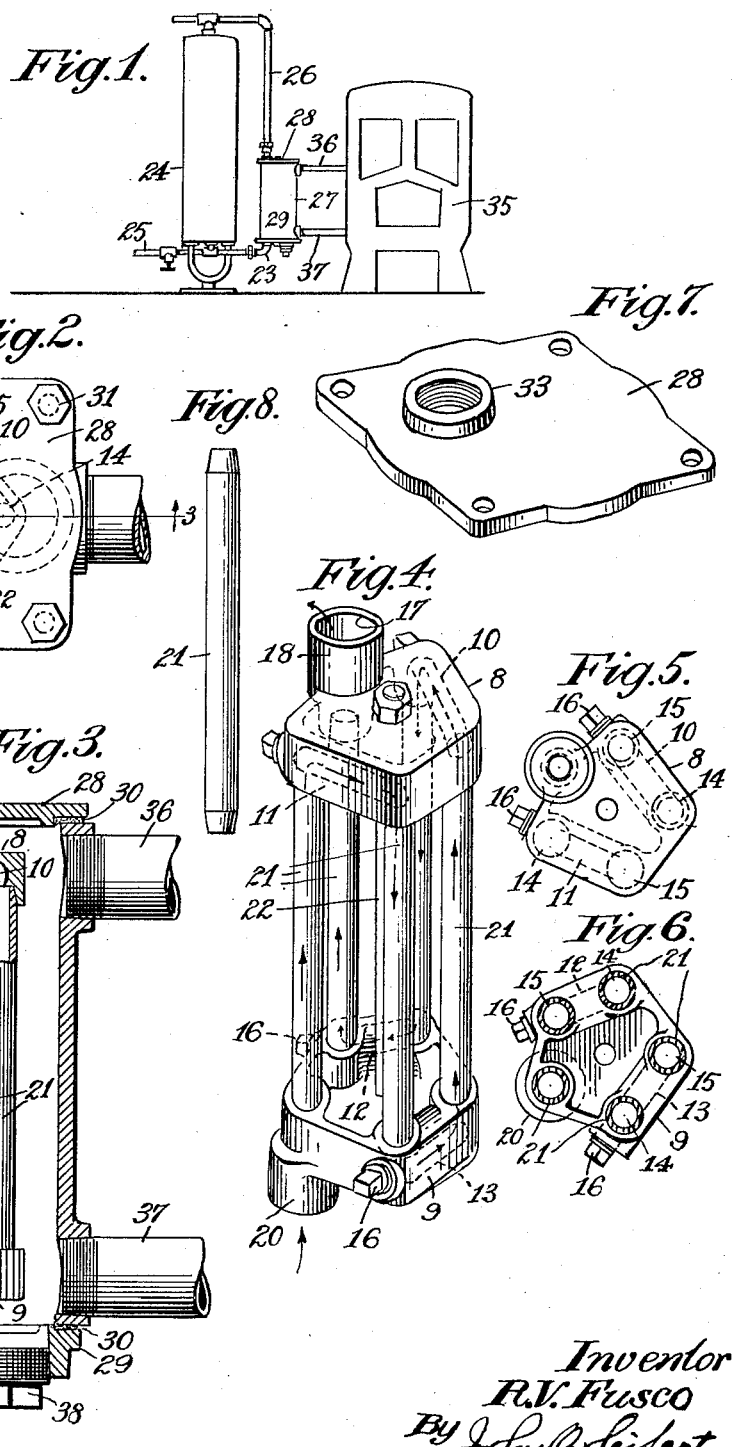

1,894,987

UNITED STATES PATENT OFFICE

RUDOLPH V. FUSCO, OF BROOKLYN, NEW YORK

SERVICE WATER HEATER

Application filed July 11, 1930. Serial No. 467,273.

This invention relates to water heaters, commonly termed as "service water heaters", to heat the water in a storage tank to provide a hot water supply, and embodying a heating unit adapted for connection in circulation with the storage tank, and said heating unit carried in a casing adapted for connection with a source of circulating heating fluid, such as a boiler of a steam or hot water heating plant, although it may also be connected with any other form of heater for the heating fluid, such as a gas, electric or coal heater.

In heaters of this character the heating unit quickly becomes obstructed due to corrosion and collection of sediment therein and preventing circulation of the water to be heated, and as no provision is made for the clearing of an obstruction from the heating unit it is necessary to substitute a new heater.

It is the object of the present invention to provide an improved constructed and arranged heater of this character which may be readily disassembled to clean the same and as readily reassembled, and to provide a heater which is simple and cheap in construction and highly efficient in use.

In the drawing accompanying and forming a part of this application Figure 1 is an elevational view of my improved water heater shown in connection with a boiler and a hot water storage tank.

Figure 2 is a plan view of the heater looking at the top of Figure 3.

Figure 3 is a sectional view of the heater taken on the line 3—3 of Figure 2 looking in the direction of the arrows.

Figure 4 is a perspective view of the heating unit.

Figure 5 is a plan view of the heating unit looking at the top of Figure 4.

Figure 6 is a sectional view taken on the line 6—6 of Figure 4 looking in the direction of the arrows.

Figure 7 is a perspective view of a head of a carrying and enclosing casing for the heating unit; and Figure 8 is a side elevation of a tube of the heating unit.

In the embodiment of the invention illustrated the heating unit comprises a pair of heads 8, 9, preferably a casting, each head having passages therein, in the present instance two in number, the passages in head 8 being indicated by 10, 11 and in head 9 by 12, 13. Each passage has an inlet 14 and an outlet 15 in a side of the head. While the passages and the inlets and outlets therefor may be cored in the casing they are preferably drilled therein, the drilling holes for the passages being closed by threading plugs 16 therein. By removing the plugs the passages may be cleared of any obstruction. The head 8 has an opening 17 therethrough, constituting the outlet of the heating unit, through a boss 18 extended from the side of the head 8 opposite to that in which the passage inlets and outlets are arranged, the opening through the boss being of increased diameter relative to that portion of the opening through the body of the head. The head 9 also has an opening therethrough, as shown in dotted lines in Figure 3, to constitute the inlet of the heating unit, and through a boss 20 extended from the side of the head 9 opposite to that in which the inlets and outlets are arranged.

The head passages are serially connected with the inlet and outlet openings 17, 19 through a series of tubes 21 having a slip-joint connection 22 with the passage inlets and outlets by bevelling the ends of the tubes and correspondingly forming the wall of the passage inlets and outlets, the head and tubes being secured in assembled condition by a rod 22 extended through openings centrally in the heads and threading nuts thereon at the outer sides of the heads to firmly draw and tie the heads to the tubes. One tube is connected with the inlet opening 19 in head 9 and the inlet 14 to passage 11; the adjacent tube is connected with the outlet 15 of passage 11 and inlet 14 of passage 13 in head 9; the next tube is connected with outlet 15 of head passage 13 and inlet 14 of head passage 10; the next tube is connected with outlet 15 of passage 10 and inlet 14 to passage 12, and the next tube is connected to outlet 15 of passage 12 and the outlet opening 17 through head 8, thereby serially connecting the inlet opening 19 in head 9 with the outlet opening 17 in head 8 through the tubes and passages, as indicated by the arrows in Figure 4. The inlet opening 19 is adapted to be connected with an outlet pipe 23 leading from a storage tank 24 connected with a source of water supply by pipe 25, and the outlet opening 17 is adapted to be connected with an inlet pipe 26 leading from the heating unit to tank 24. The pipes 23, 26 preferably have union couplings interposed therein.

The heating unit is carried and enclosed in a casing in spaced relation to the wall thereof, said casing embodying a tubular body 27 and heads 28, 29 secured to the ends of the body with an interposed packing 30 by headed screws 31 passed through perforations in the heads and threaded into lugs extended laterally from the body, as at 32. Each head has a laterally extended perforated boss 33 to which the outlet pipe 23 from and the inlet pipe 26 to the tank 24 are connected, as by screw threading, and to the inlet and outlet openings 19, 17 through the bosses 20, 18 of the heads of the heating unit. To connect the head bosses 18, 20 with the perforations in bosses 33 the inner sides of the casing heads are provided with a recess 34 concentric with and of increased diameter relative to the boss perforations and in which recesses the head bosses 18, 20 are engaged with interposed packing when the casing heads are secured to the casing body, as clearly shown in Figure 3, which also serves to mount and position the heating unit in the casing in spaced relation thereto.

The heating unit is heated by the circulation of a heating fluid in the enclosing casing therefor, for which purpose it is connected with a source of heated fluid supply, shown in the present instance as a boiler 35 of a steam or hot water heating plant, the casing being connected to the boiler by pipes 36, 37 connected with openings adjacent the top and bottom of the casing body, one opening to constitute an inlet and the other an outlet. One casing head has an opening therethrough closed by a removable plug, as at 38, which may serve as a clean-out opening, to which the pipe 37 may be connected.

Should the heating unit become clogged and it is desired to clean the same all that is required is to remove the upper head 8 by releasing the screws 31 when the heating unit may be bodily removed from the casing, and the heating unit may then be readily disassembled, the parts cleaned or others substituted therefor, and the heating unit as readily reassembled and mounted in its carrying casing.

Having thus described my invention, I claim:

In a water heater, a pair of heads, each head arranged with a series of passages and each passage having an outlet and an inlet opening through one and the same face of the head, and each head having an opening therethrough extended through a boss projecting from the face of the heads opposite to the face with the inlets and outlets to the passages, one opening constituting a water inlet and the other opening a water outlet, tubes having slip joint connections with the inlets to the passages of one head and the outlets of the passages in the other head and one tube connecting the water inlet opening in the one head with an inlet to a passage in the other head and another tube connecting the outlet opening in the other head with an outlet of a passage in said head and thereby connecting the water inlet in the one head in a continuous passage through the head passages and tubes with the water outlet opening in the other head, a tie rod arranged centrally of the heads to draw and unite the heads and tubes together in water tight connection, and a jacket enclosing the connected heads and tubes having an inlet and an outlet for connecting the same in circulation with a liquid heating medium, said jacket comprising a cylinder and heads releasably connected thereto, each head having an opening extended through a boss projecting from the outer face of the heads adapted for connection of water inlet and outlet pipes, and the opening at the inner sides of the heads being enlarged and adapted for engagement of the bosses of the tube connecting heads to position the same within the jacket in spaced relation to the walls thereof as the jacket heads are secured to the jacket cylinder and in water tight connection with the openings in the jacket heads.

Signed at New York city, in the county of New York and State of New York, this 2nd day of July, 1930.

RUDOLPH V. FUSCO.